United States Patent
Zou (10) Patent No.: US 10,528,054 B2
(45) Date of Patent: Jan. 7, 2020

(54) DETECTING FEATURES FROM MULTI-MODAL IMAGES

(71) Applicant: GM GLOBAL TECHNOLOGY OPERATIONS LLC, Detroit, MI (US)

(72) Inventor: Guangyu J. Zou, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 57 days.

(21) Appl. No.: 15/844,732

(22) Filed: Dec. 18, 2017

(65) Prior Publication Data

US 2019/0187718 A1    Jun. 20, 2019

(51) Int. Cl.
| | |
|---|---|
| G05D 1/02 | (2006.01) |
| G06K 9/00 | (2006.01) |
| G06T 5/20 | (2006.01) |
| G06T 1/20 | (2006.01) |
| G06K 9/66 | (2006.01) |
| G06N 3/04 | (2006.01) |
| G06N 3/02 | (2006.01) |
| G06N 3/08 | (2006.01) |

(52) U.S. Cl.
CPC ....... *G05D 1/0231* (2013.01); *G06K 9/00798* (2013.01); *G06K 9/66* (2013.01); *G06N 3/0454* (2013.01); *G06T 1/20* (2013.01); *G06T 5/20* (2013.01); *G06N 3/02* (2013.01); *G06N 3/082* (2013.01)

(58) Field of Classification Search
CPC .... G05D 1/0231; G06K 9/00798; G06K 9/66; G06K 9/4609; G06K 9/6255; G06T 1/20; G06T 5/20; G06T 1/0028; G06T 1/005; G06T 5/002; G06N 3/02; G08G 1/166; B60W 30/09; G06F 17/148
See application file for complete search history.

(56) References Cited

U.S. PATENT DOCUMENTS

| | | | |
|---|---|---|---|
| 9,336,436 B1* | 5/2016 | Dowdall | G08G 1/166 |
| 2003/0053717 A1* | 3/2003 | Akhan | G06T 3/4084 |
| | | | 382/302 |
| 2006/0257018 A1* | 11/2006 | Shi | G06T 1/0028 |
| | | | 382/159 |
| 2010/0049778 A1* | 2/2010 | Jachalsky | G06F 17/148 |
| | | | 708/400 |
| 2016/0104056 A1* | 4/2016 | He | G06K 9/4609 |
| | | | 382/158 |

* cited by examiner

*Primary Examiner* — Jianxun Yang
(74) *Attorney, Agent, or Firm* — Lorenz & Kopf, LLP (57) ABSTRACT

Systems and methods are provided for detecting features from multi-modal image-like data representations. The system includes a wavelet transformer configured to, via at least one processor, receive image data and to wavelet transform the image data, thereby providing decomposed image data divided into frequency sub-bands. The system further includes an artificial neural network configured to receive and process at least one sub-band of the decomposed image data to detect image features based thereon, the artificial neural network configured to output the detected image features.

18 Claims, 8 Drawing Sheets

DETECTING FEATURES FROM MULTI-MODAL IMAGES

INTRODUCTION

The present disclosure generally relates to systems and methods for detecting image features, and more particularly relates to systems and methods for detecting objects and/or road features for use in controlling a vehicle.

Autonomous and semi-autonomous vehicles are capable of sensing their environment and navigating based on the sensed environment. Such vehicles sense their environment using sensing devices such as radar, lidar, image sensors, and the like. The vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels. Some vehicles including automated vehicle features have included a plurality of optical cameras to image an environment surrounding the vehicle. Based on images obtained from the cameras, some automated vehicle systems detect lane features and/or detect objects around the vehicle for use in controlling the vehicle, e.g. by avoiding obstacles extracted from the images and obeying driving rules as indicated by road information extracted from the images.

Accordingly, it is desirable to provide systems and methods that detect image features in a computationally efficient manner. It is further desirable to provide methods and systems that detect image features using a power efficient and processing efficient artificial neural network. Furthermore, other desirable features and characteristics of the present invention will become apparent from the subsequent detailed description and the appended claims, taken in conjunction with the accompanying drawings and the foregoing technical field and background.

SUMMARY

Systems and methods are provided for detecting image features. A system for detecting image features includes a wavelet transformer configured to, via a processor, receive image data and to wavelet transform the image data, thereby providing decomposed image data divided into frequency sub-bands, and an artificial neural network configured to receive and process a sub-band of the decomposed image data to detect image features based thereon, the artificial neural network configured to output the detected image features.

In embodiments, the wavelet transformer performs a two-dimensional discrete wavelet transform function. In embodiments, the wavelet transformer performs a plural level two-dimensional discrete wavelet transform function to obtain plural levels of sub-bands of decomposed image features. In embodiments, the discrete wavelet transform includes sub-band coding.

In embodiments, the wavelet transformer includes at least one decomposition level with high and low pass filters and the decomposed image data includes at least four sub-bands including $LL_k$, $HL_k$, $LH_k$ and $HH_k$, where k represents a level of decomposition, L represents image data that has passed through a lowpass filter and H represents image data that has passed through a high-pass filter. Filters of the stages define a wavelet transform function.

In embodiments, the artificial neural network is configured to receive and process only one, some, or all of the frequency sub-bands of the decomposed image data.

In embodiments, the system includes a filter configured to remove or set to zero coefficients of the decomposed image data that are below a threshold, thereby providing filtered and decomposed image data, wherein the artificial neural network configured to receive and process a set of sub-bands of the filtered and decomposed image data to detect image features based thereon. In embodiments, the threshold is adaptively set based on the decomposed image data (e.g. the smallest 75% of coefficients are set to zero) or a static threshold is used.

In embodiments, the artificial neural network is configured to perform stimulus based drop out, whereby outputs of neurons are set to zero when input coefficients of the decomposed image are all substantially zero, without performing regular computation. In embodiments, the stimulus based drop out is performed during training and/or application of the artificial neural network.

In embodiments, the artificial neural network includes parallel computing pipelines configured to receive and process respective sub-bands of the decomposed image data and to output respective feature maps.

In embodiments, the artificial neural network is configured to concatenate the output feature maps to form concatenated feature maps and to detect image features based on the concatenated feature maps.

In embodiments, the artificial neural network includes a disabler configured to selectively disable one or more of the computational pipelines.

In embodiments, each of the parallel computing pipelines includes one or more convolutional layers.

In embodiments, the artificial neural network is configured to concatenate the output feature maps to form concatenated feature maps, wherein the artificial neural network includes one or more fully connected layers configured to detect image features based on the concatenated feature maps.

In embodiments, the image data has been received from a vehicle camera, wherein the artificial neural network is configured to detect road features in the image data, and wherein the system comprises a driving system configured to receive the detected road features and to automatically control a vehicle feature based, in part, on the detected road features. In embodiments, the road features include objects (including moving objects), lane markings, lane and road boundaries, road signs and other features associated with the road in the environment surrounding a vehicle.

In embodiments, a method for detecting image features is provided. The method includes receiving image data, via a processor, wavelet transforming the image data, via the processor, thereby providing decomposed image data divided into frequency sub-bands, processing, via an artificial neural network, one or more sub-bands of the decomposed image data to detect image features based thereon, and outputting, via the artificial neural network, the detected image features.

In embodiments, the artificial neural network processes only one, only some, or all of the frequency sub-bands of the decomposed image data.

In embodiments, the artificial neural network includes parallel computing pipelines that process respective sub-bands of the decomposed image data and output respective feature maps.

In embodiments, the artificial neural network concatenates the output feature maps to form concatenated feature maps and detects image features based on the concatenated feature maps.

In embodiments, the method includes selectively disabling one of the computational pipelines.

In embodiments, each of the parallel computing pipelines includes convolutional layers and pool layers, and wherein the artificial neural network includes fully connected layers detecting image features based on the concatenated feature maps.

In embodiments, the method includes receiving the image data from a vehicle camera or plural vehicle cameras, detecting road features in the image data, via the artificial neural network, and automatically controlling a vehicle feature based, in part, on the detected road features.

In another embodiment, a vehicle is provided. The vehicle includes a vehicle camera configured to capture an image of a vehicle environment and to provide corresponding image data, a processor configured to receive the image data and to wavelet transform the image data, thereby providing decomposed image data divided into frequency sub-bands. An artificial neural network is configured to receive and process one or more sub-bands of the decomposed image data to detect road features based thereon, the artificial neural network configured to output the detected road features. A driving system is configured to receive the detected road features and to automatically control a vehicle feature based, in part, on the detected road features.

In embodiments, the artificial neural network includes a plurality of computational pipelines configured to receive respective sub-bands of the decomposed image data and to output respective feature maps, each computational pipeline including convolutional layers and pool layers, wherein the artificial neural network is configured to concatenate the output respective feature maps to provide concatenated feature maps, and wherein the artificial neural network includes fully connected layers configured to detect road features based on the concatenated feature maps.

In embodiments, the artificial neural network is configured to process only one, only some, or all of the sub-bands of the decomposed image data.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
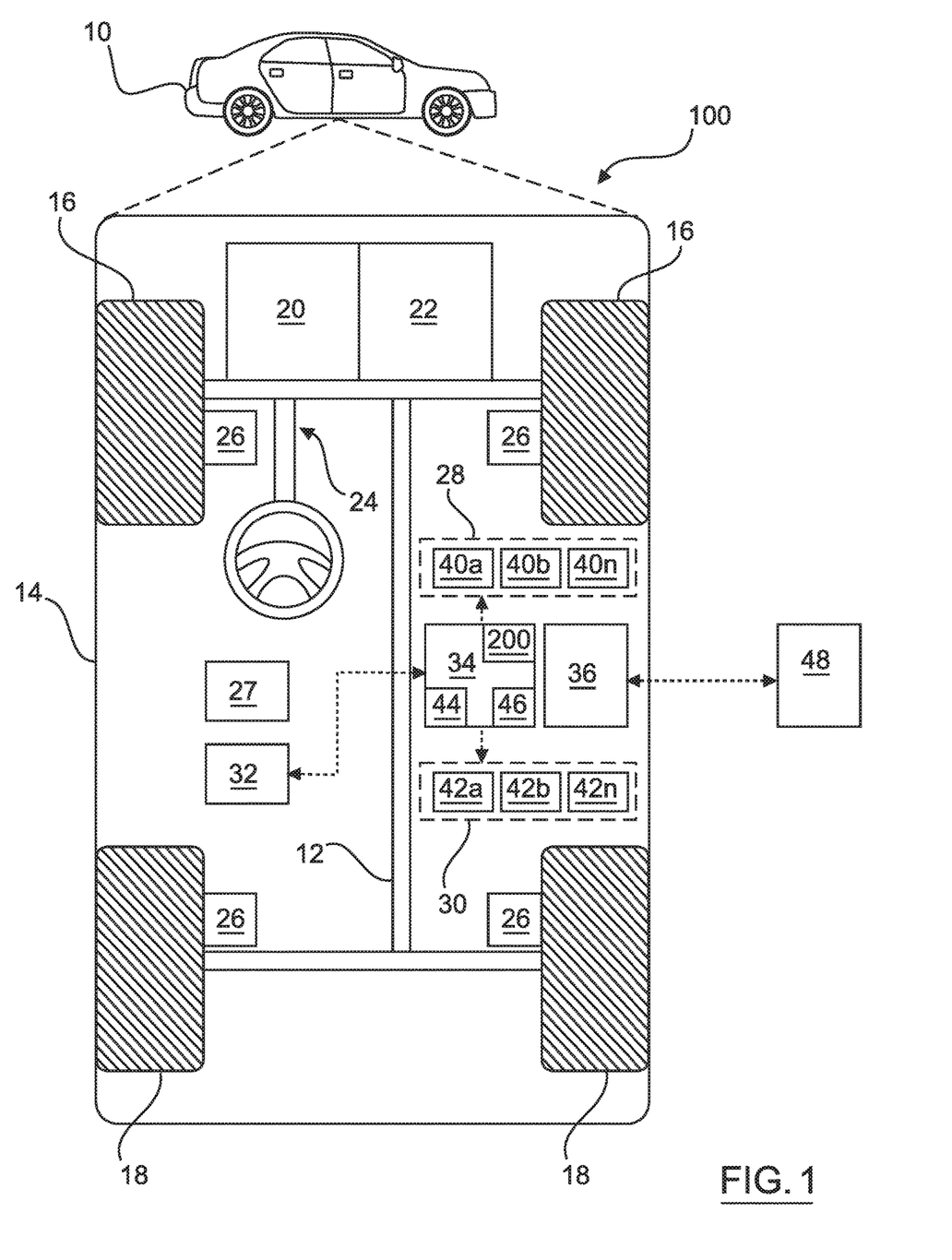
FIG. 1 is a functional block diagram illustrating a vehicle having an image feature detection system, in accordance with various embodiments.

With reference to FIG. 1, a vehicle system shown generally at 100 is associated with a vehicle 10 in accordance with various embodiments. In general, the vehicle system 100 includes an image feature detection system 200 configured to receive input image data 208, to decompose the received image data into plural sub-bands and to operate an artificial neural network for detecting image features based on sub-band divided image data. In various embodiments, the artificial neural network is configured to use wavelet parameters (coefficients) as input thereto and to process such input in performing image feature detection.

The present description primarily describes use of the image feature detection system 200 in the context of detecting image features for use in automotive applications. It should be understood, however, that the image feature detection system 200 can be used for detecting image features in a multitude of applications.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In some embodiments, the vehicle 10 is an autonomous vehicle and the image feature detection system 200 is incorporated into the vehicle 10 (hereinafter referred to as the autonomous vehicle 10). The present description concentrates on an exemplary application in autonomous vehicle applications. It should be understood, however, that the image feature detection system 200 described herein is envisaged to be used in semi-autonomous automotive vehicles including driver assist systems that make use of lane perception information, such as lane departure warning systems and lane-keeping assistance systems.

The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

Figure 4:
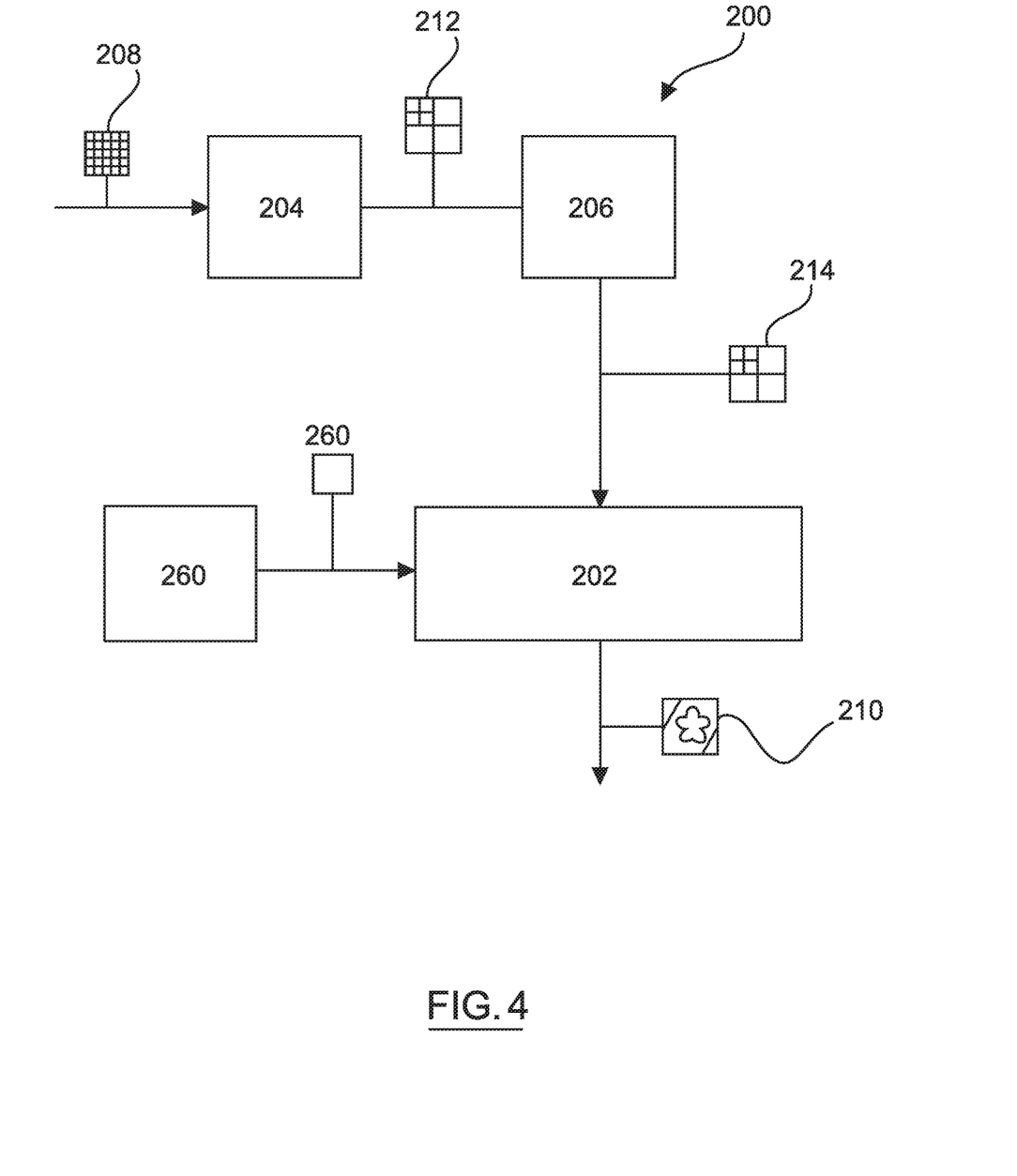
FIG. 4 is a dataflow diagram illustrating an image feature detection system, in accordance with various embodiments.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras 140a-140n, thermal cameras, ultrasonic sensors, and/or other sensors. In embodiments, the sensing devices 40a-40n include one or more cameras for obtaining images at a particular frame rate. Although described in the present embodiment with respect to camera images, images as used herein are not limited to signals from typical cameras, but also include signals from various other sensors that can be represented or converted to a grid-like structure like an image. The one or more cameras are mounted on the vehicle 10 and are arranged for capturing images of an exterior environment of the vehicle 10 (e.g. a sequence of images in the form of a video). In embodiments, the one or more cameras capture images and produce pixel-based image representations as part of input image data 208 (as illustrated in FIG. 4). Generally, the pixel based images include much redundant information and the images include relatively sparse image data of interest in detecting image features. The present disclosure proposes an image feature detection system 200 in which aspects of an artificial neural network 202 operate on lower resolution, sub-band coded, image data, without loss of interesting details for detecting image features.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, and with reference to FIG. 4, one or more instructions of the controller 34 are embodied in the image feature detection system 200 and, when executed by the processor 44, are configured to wavelet transform input image data 208 to produce decomposed image data 212 including a plurality of divided sub-bands and to detect image features using the artificial neural network 202 that takes decomposed image data 212 as an input. The artificial neural network 202 outputs detected image features data 210 for use by an automated feature of the vehicle 10.

Figure 2:
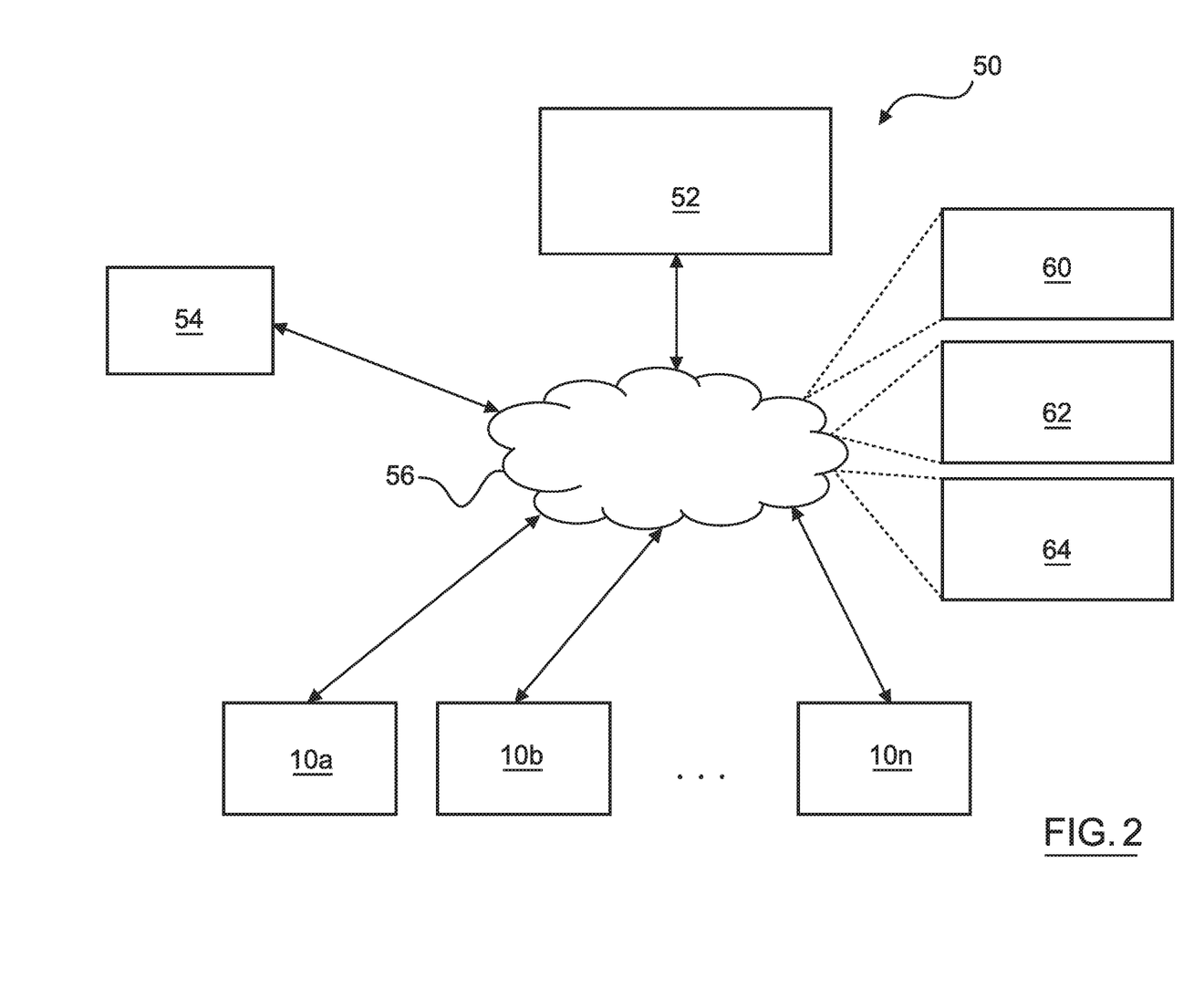
FIG. 2 is a functional block diagram illustrating a transportation system having one or more autonomous vehicles, in accordance with various embodiments

The communication system 36 is configured to wirelessly communicate information to and from other entities 48, such as but not limited to, other vehicles ("V2V" communication) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below. The subject matter described herein concerning the image feature detection system 200 is not just applicable to autonomous driving applications, but also other driving systems having one or more automated features utilizing lane computer perception capabilities. Further, the image feature detection system 200 is operable in other applications than the automotive sphere for detecting image features.

Figure 3:
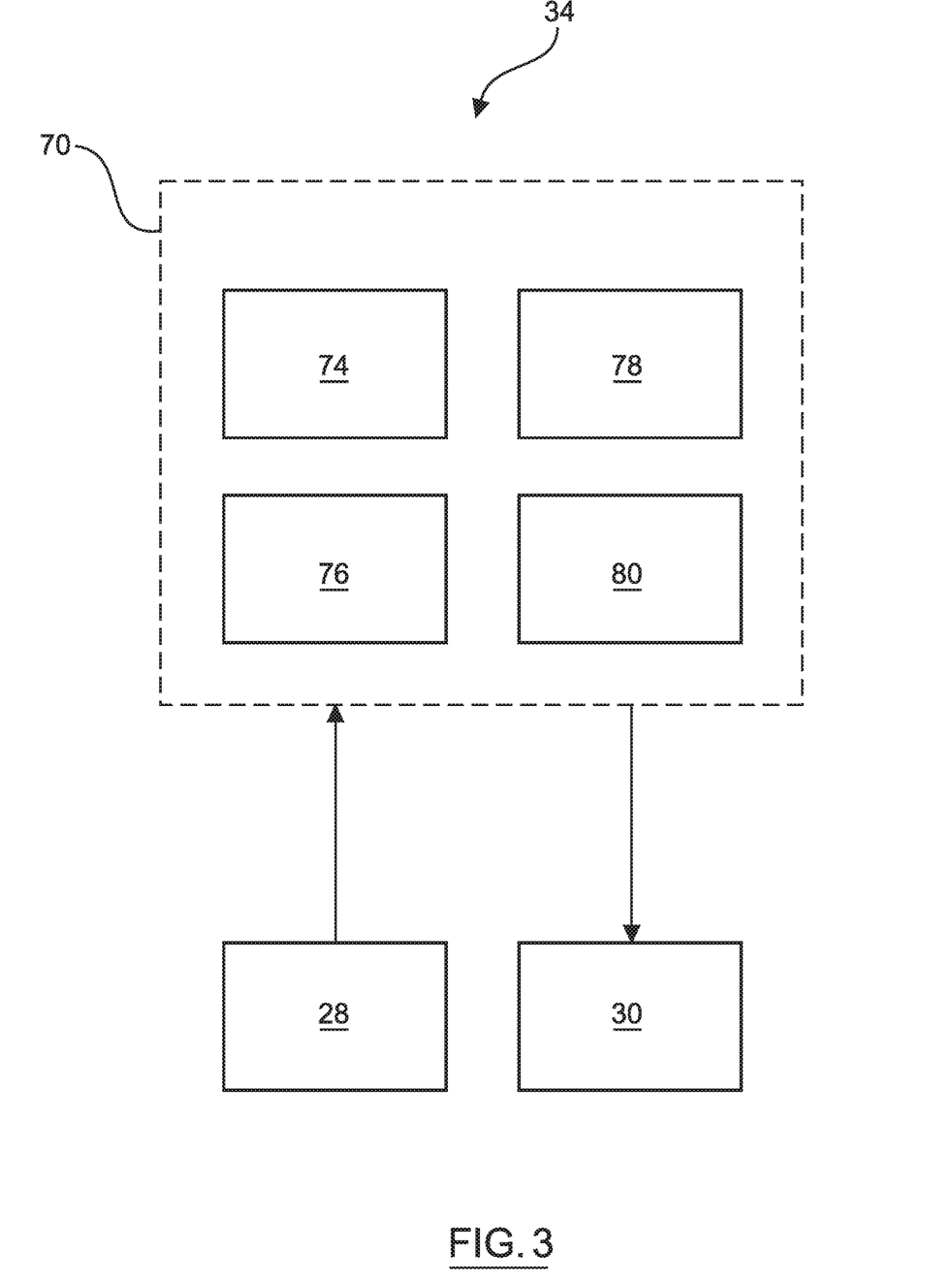
FIG. 3 is a dataflow diagram illustrating an autonomous driving system that includes an image feature detection system in an autonomous vehicle, in accordance with various embodiments.

In accordance with an exemplary autonomous driving application, the controller 34 implements an autonomous driving system (ADS) 70 as shown in FIG. 3. That is, suitable software and/or hardware components of the controller 34 (e.g., the processor 44 and the computer-readable storage device 46) are utilized to provide an autonomous driving system 70 that is used in conjunction with vehicle 10.

In various embodiments, the instructions of the autonomous driving system 70 may be organized by function, module, or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, the image feature detection system 200 of FIG. 1 (and FIG. 4) is included within the ADS 70 in autonomous driving applications, for example, as part of computer vision system 200. The image feature detection system 200 is configured to output detected image features data 210 for use in various possible automated control modules that rely on image feature detection such as image feature classification and localization. In some embodiments, the detected image features data 210 includes road feature data (such as road boundaries and road markings including road side signs and traffic lights) including lane feature data (such as lane boundaries and lane markings) and surrounding objects data (including pedestrians, other vehicles, buildings, etc.). Such detected image features data 210 is utilizable by the guidance system 78 to determine upon a trajectory for the vehicle 10. The vehicle control system 80 works with actuator system 80 to traverse such a trajectory.

For example, as shown in more detail with regard to FIG. 4, and with continued reference to FIGS. 1 to 3, the image feature detection system 200 includes a wavelet transformer 204 that receives input image data 208 from one or more image capture devices (e.g. optical camera) 40a to 40n, or from converters that convert other data modalities captured from various other sensors into a grid-like image format and decomposes the input image data 208 into decomposed image data 212 that includes frequency sub-bands. An optional filter 206 is configured to remove or set to zero data in the decomposed image data 212 having coefficients that are substantially zero or coefficients that are below a threshold, representing pixels with little information content with respect to the purpose of detecting image features. An artificial neural network 202 is configured to process one or more of the frequency sub-bands included in the decomposed image data 212 or the filtered and decomposed image data 214 and to provide detected image features data 210. The detected image features data 210 are used by a driving system such as a driving assist system or the autonomous driving system 200 described with respect to FIG. 3 in some embodiments or are used by another application using automated feature perception as an input.

Figure 5:
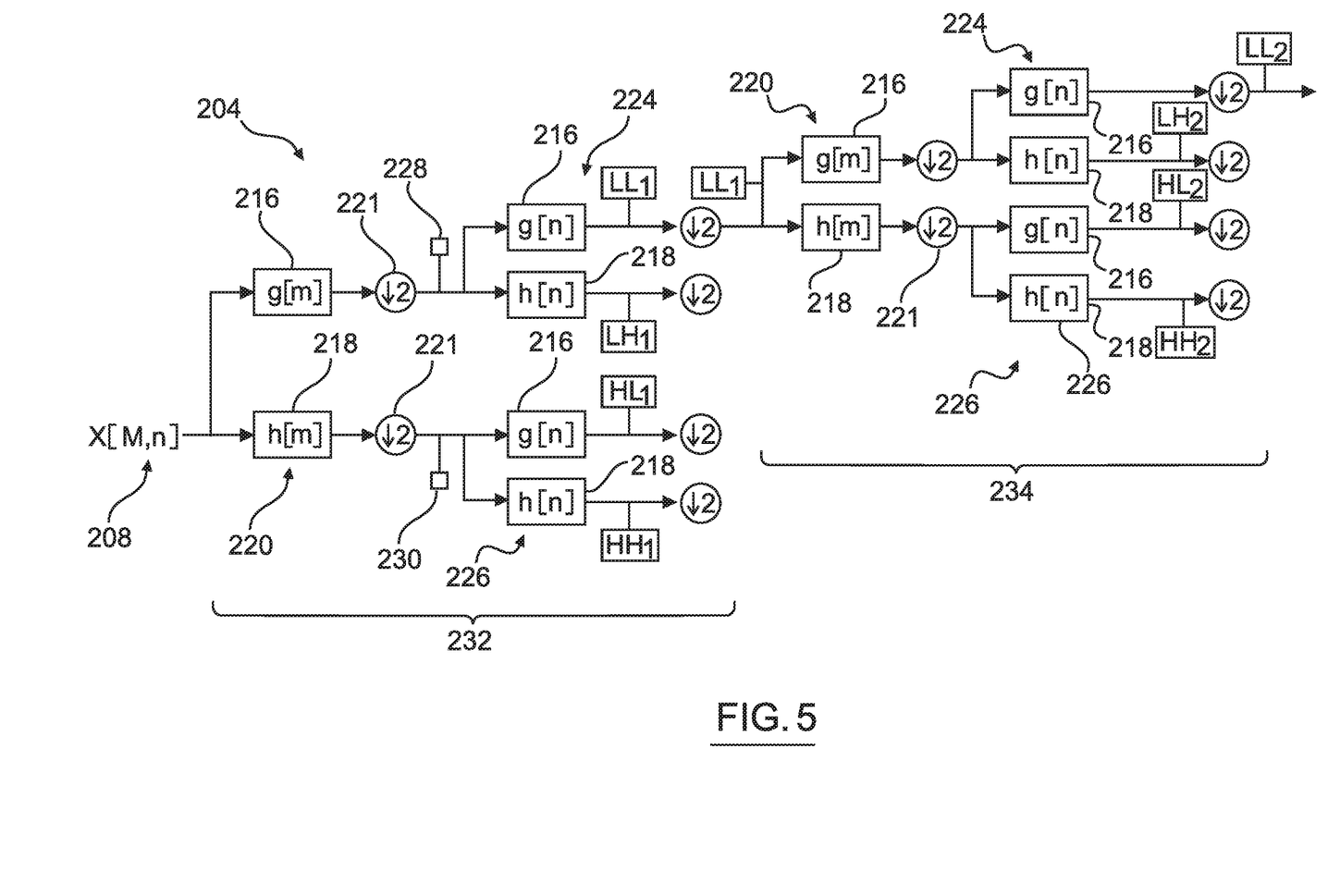
FIG. 5 illustrates a wavelet transformer in two dimensions, in accordance with various embodiments.

In more detail, an exemplary configuration of the wavelet transformer 204 is illustrated in FIG. 5. It should be appreciated that FIG. 5 illustrates one technique of sub-band coding of input image data. Other discrete wavelet transform techniques are used in alternative embodiments, which provide decomposed image data 212 divided into a plurality of frequency sub-bands.

In the exemplary embodiment of FIG. 5, the wavelet transformer 204 receives a two-dimensional digital image array X [m, n] representing input image data 208 and including m rows and n columns. The wavelet transformer 204 includes a plurality of filter banks 220, 224, 226 each including a low pass filter 216 and a high pass filter 218. The low and high pass filters 216, 218 include discrete wavelet transform functions embodying wavelets such as Beylkin, BNC wavelets, Coiflet, Cohen-Daubechies-Feauveau wavelet, Daubechies wavelet, Binomial-QW (also referred to as Daubechies wavelet), Haar wavelet, Mathieu wavelet, Legendre wavelet, Villasenor wavelet, Symlet, etc. Following each filter 216, 218 is a down sampler 221 for decimating output of the filter 216 by two. The wavelet transformer 204 includes at least one stage 232, 234 including first filter banks 220, second filter banks 224 and third filter banks 226.

In a discrete wavelet transform process, as applied by the wavelet transformer 204, the input image data 208 is received by the first filter bank 220 and, after down sampling by the respective down samplers 221, is split into low frequency components or coefficients 228 and high frequency components or coefficients 230. The low frequency coefficients 228 extract coarse or approximate information from the input image data 208 and the high the frequency coefficients 230 extract detailed information from the input image data 208. The low frequency coefficients 228 are input to the second filter bank 224 and the high frequency coefficients 230 are input to the third filter bank 226. The first filter bank 220 performs a one dimensional discrete wavelet transform on rows of the input image data 208 to produce low frequency and high frequency coefficients 228, 230. The second filter bank 224 performs a column wise one dimensional discrete wavelet transform on the low frequency coefficients 228 and the third filter bank 226 performs a column wise one dimensional discrete wavelet transform on the high frequency coefficients 230. In this way, a first stage 232 of the wavelet transformer 204 performs a two-dimensional discrete wavelet transform to produce first level discrete wavelet transform coefficients $LL_1$, $LH_1$, $HL_1$, $HH_1$.

In embodiments, the lowest frequency sub-band of a stage 232 of the wavelet transformer 204 is decomposed by a further stage 234. This process of stage by stage decomposition can be repeated successively to a desired number of levels in a process of multi-level decomposition. In the illustrated embodiment, a two-level decomposition process is illustrated that includes the first stage 232 of filter banks 220, 224, 226 and the second stage 234 of decimated filter banks 220, 224, 226. The second stage 234 receives $LL_1$ coefficients from the first stage 232 and performs two one-dimensional discrete wavelet transforms. The first one-dimensional discrete wavelet transform includes the first filter bank 220 performing the filtering process along the row followed by decimation by two through down samplers 221. The second one-dimensional discrete wavelet transform includes the second and third filter banks 224, 226 filtering the high and low frequency sub-bands from the first filter bank 220 column wise and decimating the result by two through the down samplers 221. As a result, operation of the second stage 234 splits the input data LL1 into four further sub-bands $LL_2$, $LH_2$, $HL_2$ and $HH_2$.

In embodiments, the wavelet transformer 204 includes k stages 232, 234 of filter banks 220, 224, 226 to decompose input image data 208 into k levels (where k=1, 2, 3 or a greater integer number) of coefficients making up decomposed image data 212 including $LL_k$, $LH_k$, $HL_k$ and $HH_k$ from the kth stage 232, 234 of the wavelet transformer 204. LL represents image data that has passed through both low pass filters 216 of a stage 232, 234 of the wavelet transformer 204. LH represents image data that has passed through a low pass filter 216 followed by a high pass filter 218 of a stage 232, 234 of the wavelet transformer 204. HL represent image data that has passed through a high pass filter 218 followed by a low pass filter 216 of a stage 232, 234 of the wavelet transformer 204. HH represent image data that has passed through both high pass filters 218 of a stage 232, 234 of the wavelet transformer 204.

Figure 6:
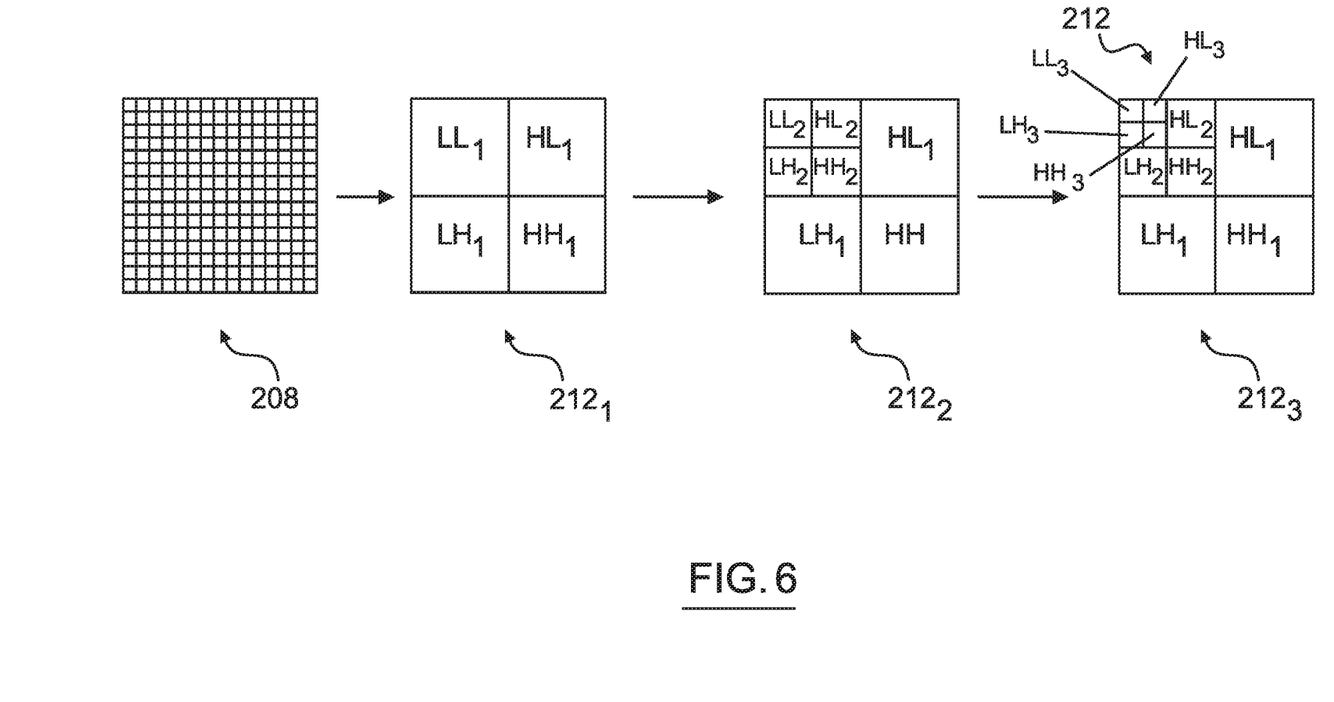
FIG. 6 illustrates various levels of decomposed image data, in accordance with various embodiments.

FIG. 6 illustrates example wavelet transformations, via wavelet transformer 204, of input image data 208 to decomposed image data 212. A first level decomposition is shown by reference numeral $212_1$, which includes a lowest frequency sub-band $LL_1$ and other sub-bands $HL_1$, $LH_1$ and $HH_1$. The first level decomposed image data $212_1$ is produced by a wavelet transformer 204 including only a first stage 232. A second level of decomposed image data $212_2$ is also illustrated, which includes a lowest frequency sub-band $LL_2$ and other sub-bands $HL_2$, $LH_2$, $HH_2$, $LL_1$, $HL_1$, $LH_1$ and $HH_1$. The second level decomposed image data $212_2$ is, in embodiments, produced by a wavelet transformer 204 as illustrated in FIG. 5. A third level of decomposed image data $212_3$ is also illustrated, which includes a lowest frequency sub-band $LL_3$ and other sub-bands $HL_3$, $LH_3$, $HH_3$, $HL_2$, $LH_2$, $HH_2$, $LL_1$, $HL_1$, $LH_1$ and $HH_1$. The third level decomposed image data $212_3$ is produced by a wavelet transformer 204 similar to that shown in FIG. 4, but including a third stage of filter banks 220, 224, 226 that operate on $LL_2$ decomposed image data 212 produced by the second stage 234.

Returning to FIG. 4, but with continued reference to FIGS. 1 to 3, 5 and 6, the image feature detection system 200 includes a filter 206, in some embodiments. The decomposed image data 212 includes coefficients for each sub-band of wavelet transformed image data. The decomposed image data 212 can be significantly compressed by removing or setting to zero a portion of the image data having the smallest coefficients. For example, the smallest X % (e.g. where X is 50% or more) of coefficients could be removed from or zeroed in the decomposed image data 212. In another example, all substantially zero coefficients are removed or set to zero or coefficients below a static or adaptive threshold are removed or set to zero. Having filtered the decomposed image data 212 based on coefficient value, the filter 206 outputs filtered and decomposed image data 214 that is significantly data compressed as compared to the decomposed image data 212.

As shown in the exemplary embodiment of FIG. 4, the artificial neural network 202 is configured to receive the filtered and decomposed image data 214 and to perform image feature detection based thereon. In other embodiments not including the filter 206, the artificial neural network 202 is configured to detect image features based on the decomposed image data 212.

Figure 7:
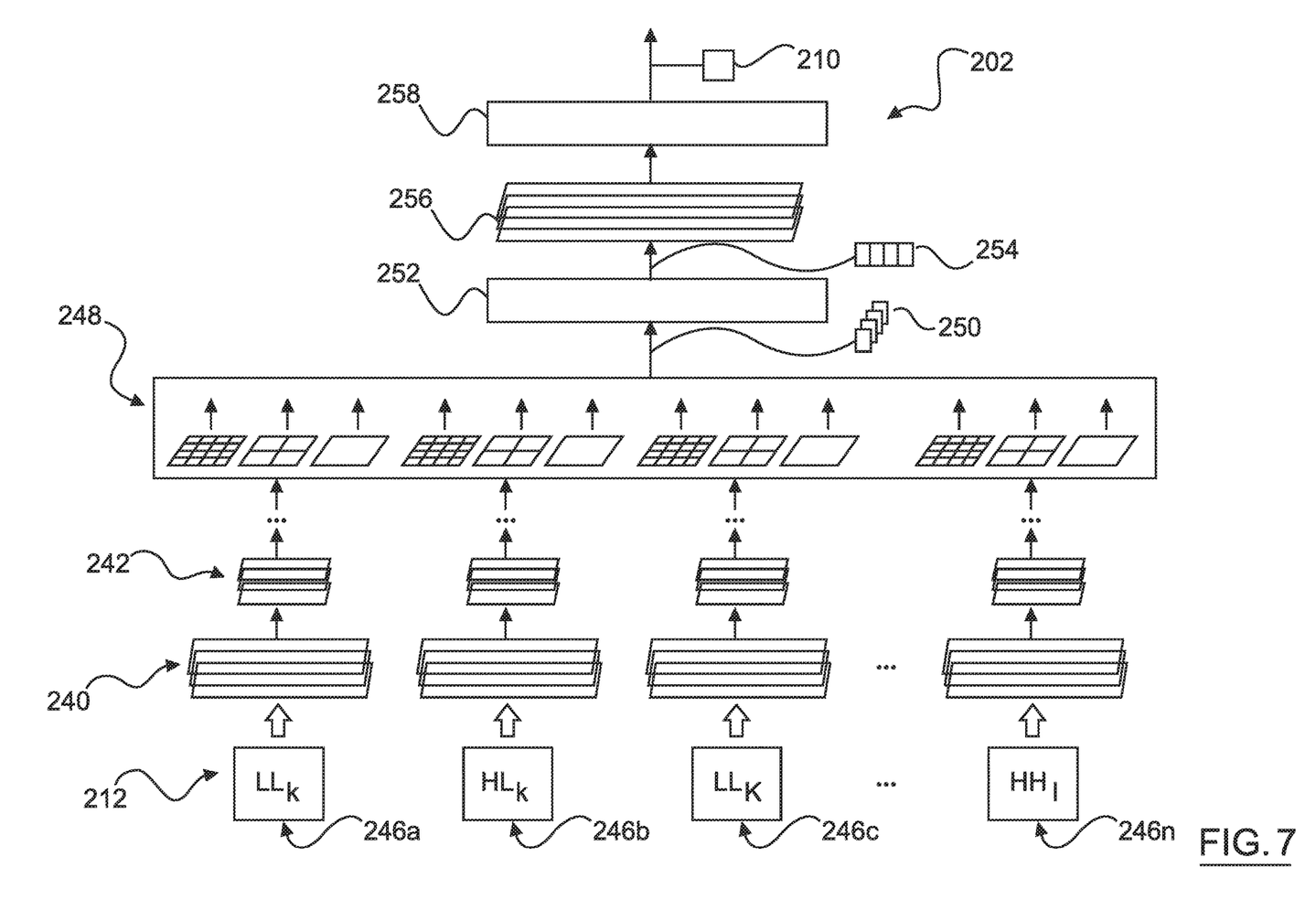
FIG. 7 is an artificial neural network architecture, in accordance with various embodiments.

FIG. 7 illustrates an exemplary architecture of the artificial neural network 202. The artificial neural network receives decomposed image data 212, 214, which is divided into respective sub-bands $LL_k$, $HL_k$, $LH_k$ . . . $HH_1$ of data, with each sub-band of decomposed image data 212, 214 including an array of discrete wavelet transform coefficients. As such, the artificial neural network 202 is configured to operate on image data in its frequency decomposed form. Most information, with respect to the purpose of image feature detection, is concentrated in the $LL_k$ sub-band. As such, the artificial neural network 202 is configured to allow the possibility to disable operations on one or more other sub-bands of decomposed image data 212, as will be described in further detail below. In some embodiments, the artificial neural network 202 is configured to disable all but the lowest frequency sub-band $LL_k$.

The artificial neural network 202 includes plural computational pipelines 246a to 246n each receiving respective sub-bands of decomposed image data 208. In some embodiments, there is a computational pipeline 246a to 246n for each sub-band of decomposed image data 208. That is, there are 4k-k+1 computational pipelines 246a to 246n, where k is the level of decomposition of the image data as hereinbefore described. In other embodiments, only one or some of the sub-bands included in the decomposed image data 208 are processed by the artificial neural network 202 and a corresponding number of computational pipelines 246a to 246n are provided. The computational pipelines 246a to 246n enable simultaneous multi-scale image inference.

In embodiments, each computational pipeline includes convolutional layers 240 and pool layers 242. Each computational pipeline 246a to 246n further includes a spatial pyramidal pooling layer 248 for outputting a fixed length feature map 250 for each computational pipeline 246a to 246n. The feature maps 250 output from the spatial pyramidal pooling layer 248 are concatenated by concatenation module 252 of the artificial neural network 202 to provide concatenated feature maps 254.

The artificial neural network 202 includes fully connected layers 256 and a softmax function 258 (or other classifier arrangement) configured to output detected image features data 210 based on the concatenated feature maps 254. In embodiments, the detected image features data 210 includes image feature classification and/or localization. In automotive embodiments, the detected image features data 210 classifies and localizes road features such as one or more of lane markings, road boundaries, road markings, road signs, moving objects such as pedestrians and other vehicles and static objects such as traffic lights and buildings. In automotive applications, the output detected image features data 210 is utilized by an automated vehicle control function or by computer vision system 78 in autonomous vehicle embodiments to control one or more automated vehicle features relying on environment perception as an input. In other embodiments, an application implements perception based control based on detected image features data 210.

In some embodiments, the artificial neural network 200 is configured to operate a stimulus based dropout scheme during training and optionally also during runtime of the artificial neural network 202. For each neuron of the artificial neural network 202, a determination is made as to whether certain inputs are zero or substantially zero. If any input is zero or substantially zero, it is not involved in the computation in each neuron (synapse frozen). If all inputs are zero or substantially zero, the output of the neuron is set to zero bypassing the regular computation in each neuron (neuron frozen). Such frozen synapses and neurons do not contribute to either training or inference processes with the input image. Stimulus based dropout is applied, in embodiments, to one or more of the convolutional layers 240 and fully connected layers 256 by the artificial neural network 200. Except for the $LL_k$ subband, all other subbands exhibit large amounts of near-zero coefficients. In various embodiments, the filter 206 and/or the stimulus dropout scheme operated by the artificial neural network 202 are configured to dropout data at both training and inference stages, thereby allowing the artificial neural network 202 to reduce the number of operations (and thus lower power requirements), to reduce overfitting, to improve convergence during training and to achieve faster inference. The stimulus-based dropout scheme can be used in conjunction with conventional random dropout scheme, which is mostly applied to fully connected layers only.

Referring to FIG. 4, the image feature detection system 200 includes a disabler 260 configured to output pipeline disable data 260 for determining whether, and how many, of the computational pipelines 246a to 246n should be disabled. In embodiments, higher frequency sub-band pipelines 246a to 246n are disabled when the one or more other lower frequency sub-band computational pipelines 246a to 246n are sufficient for a specific perception task, thus reducing computational and power consumption requirements. In one embodiment, the disabler 260 is configured to determine the pipelines disable data 260 based on an indicator of success of the artificial neural network 202 in detecting image features such that when high success is considered to be achieved, e.g. via multi-round regression, the artificial neural network 202 is able to reduce the number of computational pipelines 246a to 246n. In some embodiments, an assessment of system resource is used as a parameter in determining whether computational pipelines 246a to 246n should be disabled, whereby greater system loads can be eased by disabling one or more computational pipelines 246a to 246n. In some embodiments, system mode of image feature detection system 200, such as training mode or a particular perception task mode, is used by disabler 260 to switch off at least one of the computational pipelines 246a to 246n.

As described hereinbefore, the present disclosure provides an artificial neural network 202 in the form of a deep neural network architecture that exploits image sparsity by processing just one sub-band (e.g. $LL_k$) or just some sub-bands of the decomposed image data 212, 214, whilst still being able to effectively identify image features. In some embodiments, the artificial neural network 202 includes multiple parallel computational pipelines 246a to 246n for each frequency sub-band, whereby one or more of the computational pipelines 246a to 246 are able to be selectively disabled. Further, the artificial neural network 202 is configured to activate neurons and synapses only when there are significant local stimuli thereto, in some embodiments.

Yet further, faster training and inferencing through the artificial neural network 202 is possible when just one or some of the sub-bands are run and/or when coefficients are set to zero through stimulus based dropout and/or through filter 216. The artificial neural network 202 is able to reduce power consumption and heat generation at forward inference stage by only concentrating computation on significant stimuli in the wavelet domain, in some embodiments. The artificial neural network 202 supports low-power, high-efficiency hardware implementation, such as ASIC/FPGA-based hardware platforms. In autonomous applications, the artificial neural network provides a universal underlying utility to various vehicle perception features and associated automated vehicle control features relying on vehicle perception as input thereto.

Figure 8:
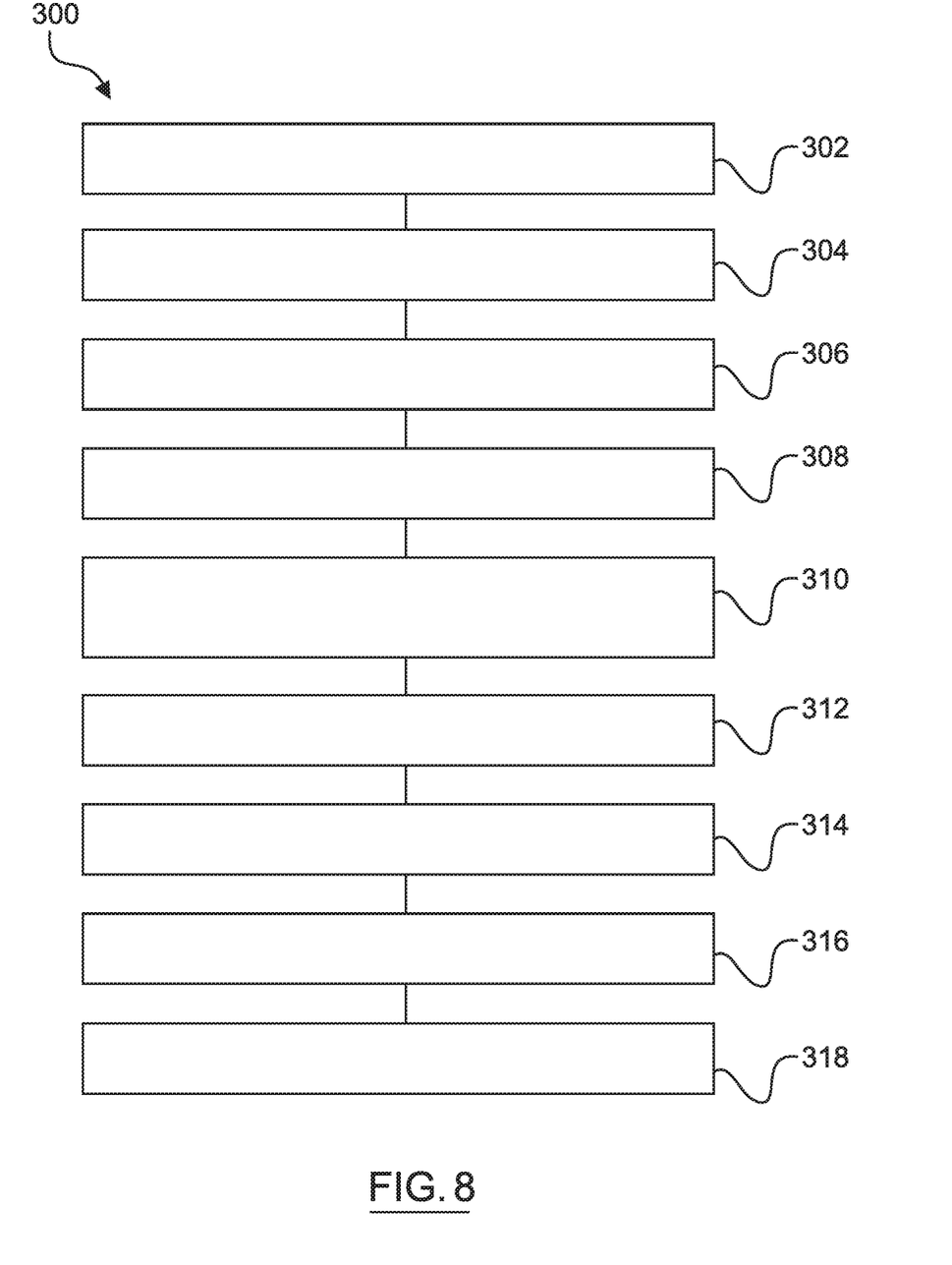
FIG. 8 is a flowchart illustrating a control method for controlling the autonomous vehicle, in accordance with various embodiments.

Referring now to FIG. 8, and with continued reference to FIGS. 1-7, a flowchart illustrates a control method 300 that can be performed by the image feature detection system 200 of FIG. 4 in accordance with the present disclosure. As can be appreciated in light of the disclosure, the order of operation within the method is not limited to the sequential execution as illustrated in FIG. 8, but may be performed in one or more varying orders as applicable and in accordance with the present disclosure. In various embodiments, the method 300 can be scheduled to run based on one or more predetermined events, and/or can run continuously during operation of the semi-autonomous or autonomous vehicle 10 or during operation of some other application.

At 302, input image data 208 is received by the image feature detection system 200. The input image data 208 is received from one or more image capture devices included in sensor system 28, such as optical cameras. In embodiments, the input image data 208 includes an array of pixel values. Much of the data included in the input image data 208 is high in sparsity with respect to detection of image features.

At 304, a wavelet transform process is performed, via wavelet transformer 204, on the input image data 208 to divide the image into a plurality of sub-bands as part of decomposed image data 212. In one embodiment, the wavelet transform process includes a sub-band coding process. An exemplary wavelet transformer 204 is described in detail in the foregoing with respect to FIG. 5. The wavelet transform process produces, in some embodiments, a lowest frequency sub-band (e.g. $LL_k$) and a plurality of other bands (e.g. $HL_k$, $LH_k$, $HH_k$, amongst others) as part of decomposed image data 208.

At 306, an optional coefficient based filtration process is performed, via filter 206. Each sub-band of decomposed image data 212 is filtered to remove or set to zero relatively low coefficients. That is, a certain threshold percentage of the lowest coefficients are removed or set to zero, or all coefficients below a certain threshold are removed or set to zero, amongst other possible coefficient based filtering methods. Step 306 thus compresses the decomposed image data 212 and outputs filtered and decomposed image data 214. By operating on relatively compressed filtered and decomposed image data 212, the artificial neural network 202 is able to run more efficiently.

At 308, one or more computational pipelines 246a to 246n are activated to run on respective input sub-bands of the decomposed image data 212, 214. In some embodiments, the number of computational pipelines 246a to 246n, and thus the number of sub-bands of decomposed image data 212, 214 being utilized by the artificial neural network, is dynamically set. In embodiments, the disabler 260 provides pipeline disable data 260 to set which computational pipelines are to be active and which are to be disabled. The disabler 260 generates the disable data 260 based on system load, perception task, sparsity of detected features for a given computational pipeline 246a to 246n, etc. The artificial neural network 202 is configured to operate at least one mode whereby one, some or all of the computational pipelines 246a to 246n are operated, and thus only one, some or all of the sub-bands of decomposed image data 246a to 246n are used by the artificial neural network 202. In embodiments, at least the lowest frequency sub-band (e.g. $LL_k$) in the decomposed image data 212, 214 is run by computational pipeline 246a of the artificial neural network 202. By disabling one or more computational pipelines 246a to 246n, efficiency of the artificial neural network is able to be increased.

At 310, each activated computational pipeline 246a to 246n is operated on respective sub-bands of decomposed image data 212, 214. That is, each sub-band of decomposed image data 212, 214 includes, in some embodiments, an array of frequency coefficients that are passed through convolutional layers 240, pool layers 242 and spatial pyramidal pooling layer 248 to generate fixed length feature maps 250.

At 312, stimulus based dropout is performed for at least one convolutional layer 240 in each of the computational pipelines 246a to 246n, whereby outputs of neurons are set to zero when all inputs to that neuron are zero or substantially zero. For the first of the convolutional layers 240, outputs of neurons are set to zero when all input coefficients from the decomposed image data 214, 214a are zero or near zero (e.g. below a near zero threshold). Stimulus based dropout allows for further increase in efficiency of the artificial neural network 202.

At 314, the feature maps 250 are concatenated, via the artificial neural network 202, to provide concatenated features maps 254. Concatenation is a process of linking together in series more than one feature map 250 from respective computational pipelines 246a to 246n. The features maps 250 may be linked column wise, row wise, or both.

At 316, the concatenated feature maps 254 are processed by fully connected layers 256 including softmax function 258 to provide detected image features data 210. The detected image features data 210 includes, in embodiments, classification of image features according to categories of the fully connected layers 256. In embodiments, the detected image features data 210 includes localization for each classified image feature. In automotive embodiments, the image features include road features as hereinbefore described.

At 318, and in automotive embodiments, an automated vehicle control feature is controlled based on detected image features data 210. For example, driving assistance systems are controlled based on road features detected as part of image features data 210. In another example, vehicle control system 80 controls autonomous vehicle 10 based on road features detected as part of image features data 210. Although the present disclosure is directed to automotive applications in embodiments, other applications are envisaged whereby control is executed through perception that would utilize detected image features data 210.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for detecting image features, the system comprising:
a wavelet transformer configured to, via at least one processor, receive image data and to wavelet transform the image data, thereby providing decomposed image data divided into frequency sub-bands, wherein the image data is pixel based, includes redundant information, and includes relatively sparse image data of interest in detecting image features; and
an artificial neural network configured to:
receive the frequency sub-bands of the decomposed image data;
process the frequency sub-bands of the decomposed image data and output respective feature maps, wherein the frequency sub-bands include image data coded and of a lower resolution than the pixel based image data to concentrate computation of the processor on select stimuli without loss of details for detecting image features;
generate a set of parallel computational pipelines for each of the frequency sub-bands;
determine the parallel computational pipelines that have a sparsity of detected image features;
selectively disable the parallel computational pipelines that have the sparsity of detected image features; and
output the detected image features.

2. The system of claim 1, wherein the wavelet transformer is configured to process only a lowest of the frequency sub-bands through a second stage decomposition to further divide the image data into additional frequency sub-bands.

3. The system of claim 1, comprising a filter configured to remove or set to zero coefficients in the decomposed image data that are below a threshold and that represent pixels with limited information content with respect to detecting image features, thereby providing filtered and decomposed image data, wherein the artificial neural network is configured to receive and process at least one sub-band of the filtered and decomposed image data to detect image features based thereon.

4. The system of claim 3, wherein the filter is configured to:
split the image input data into low frequency coefficients and high frequency coefficients, wherein the low frequency coefficients are configured to extract coarse information from the image data and the high frequency coefficients are configured to extract detailed information from the image data;
perform, by a first filter bank, a one dimensional discrete wavelet transform on rows of the input image data to produce the low frequency coefficients and the high frequency coefficients;
perform, by a second filter bank, a column wise one dimensional discrete wavelet transform on the low frequency coefficients;
perform, by a third filter bank, a column wise one dimensional discrete wavelet transform on the high frequency coefficients;
produce first level discrete wavelet transform coefficients;
extract the coarse information from the input image data using the low frequency coefficients; and
extract the detailed information from the input image data using the high frequency coefficients.

5. The system of claim 1, wherein the artificial neural network is configured to perform stimulus based drop out, whereby outputs of neurons are set to zero when all inputs to the neuron, of coefficients of the decomposed image, are substantially zero.

6. The system of claim 5, wherein the artificial neural network is configured to concatenate the output feature maps to form concatenated feature maps and to detect image features based on the concatenated feature maps.

7. The system of claim 5, comprising a disabler configured to output pipeline disable data that determines which computational pipelines are disabled.

8. The system of claim 7, wherein first frequency sub-band computational pipelines are disabled when one or more second frequency sub-band computational pipelines are sufficient for a specific perception task, thus reducing computational and power consumption requirements.

9. The system of claim 8, wherein the disabler is configured to determine the pipeline disable data based on an indicator of success of the artificial neural network in detecting image features, wherein the indicator comprises a multi-round regression.

10. The system of claim 1, wherein the image data has been received from a vehicle camera, or converted into an image like format from one or more other sensor modalities, wherein the artificial neural network is configured to detect road features in the image data, and wherein the system comprises a driving system configured to receive the detected road features and to automatically control at least one vehicle feature based, in part, on the detected road features.

11. A method for detecting image features, the method comprising:
receiving image data, via at least one processor, wherein the image data is pixel based, includes redundant information, and includes relatively sparse image data of interest in detecting image features;
wavelet transforming the image data, via the at least one processor, thereby providing decomposed image data divided into frequency sub-bands;
processing, via an artificial neural network, at least one sub-band of the decomposed image data to detect image features based thereon, wherein the sub-band image data is coded and of a lower resolution than the pixel based image data to concentrate computation of the processor on select stimuli without loss of details for detecting image features, wherein the artificial neural network includes parallel computational pipelines that process respective sub-bands of the decomposed image data and output respective feature maps;
determining the parallel computational pipelines have a sparsity of detected features;
selectively disabling the parallel computational pipelines that have the sparsity of detected features; and
outputting, via the artificial neural network, the detected image features.

12. The method of claim 11, comprising:
splitting, by a filter, the image input data into low frequency coefficients and high frequency coefficients, wherein the low frequency coefficients are configured to extract coarse information from the image data and the high frequency coefficients are configured to extract detailed information from the image data;

extracting the coarse information from the input image data using the low frequency coefficients;

extracting the detailed information from the input image data using the high frequency coefficients;

performing, by a first filter bank, a one dimensional discrete wavelet transform on rows of the input image data to produce the low frequency coefficients and the high frequency coefficients;

performing, by a second filter bank, a column wise one dimensional discrete wavelet transform on the low frequency coefficients;

performing, by a third filter bank, a column wise one dimensional discrete wavelet transform on the high frequency coefficients; and producing first level discrete wavelet transform coefficients.

13. The method of claim 11, wherein the artificial neural network concatenates the output feature maps to form concatenated feature maps and detects image features based on the concatenated feature maps, including linking together in series more than one feature map from respective computational pipelines.

14. The method of claim 11, wherein each decomposed sub-band image data includes an array of frequency coefficients, and further comprising passing the array of frequency coefficients through convolutional layers, pool layers and spatial pyramidal pooling layer; and generating fixed length feature maps therefrom.

15. The method of claim 11, comprising receiving the image data from a vehicle camera, or converted into an image like format from one or more other data modalities captured from one or more other vehicle sensors, detecting road features in the image data, via the artificial neural network and automatically controlling at least one vehicle feature based, in part, on the detected road features.

16. A vehicle, comprising:

a vehicle camera or other environment sensor device configured to capture data on a vehicle environment and to provide corresponding image data;

at least one processor configured to:

wavelet transform the image data providing decomposed image data divided into frequency sub-bands;

split, by a filter, the image data into low frequency coefficients and high frequency coefficients, wherein the low frequency coefficients are configured to extract coarse information from the image data and the high frequency coefficients are configured to extract detailed information from the image data;

perform, by a first filter bank, a one dimensional discrete wavelet transform on rows of the image data to produce the low frequency coefficients and the high frequency coefficients;

perform, by a second filter bank that receives the low frequency coefficients, a column wise one dimensional discrete wavelet transform on the low frequency coefficients;

perform, by a third filter bank that receives the high frequency coefficients, a column wise one dimensional discrete wavelet transform on the high frequency coefficients;

produce first level discrete wavelet transform coefficients;

extract coarse information from the input image data using the low frequency coefficients; and extract detailed information from the input image data using the high frequency coefficients;

an artificial neural network configured to receive the filtered and decomposed image data to detect image features based thereon and process only those of the frequency sub-bands that contain select image features of the decomposed image data to detect road features based thereon, the artificial neural network configured to output the detected road features; and a driving system configured to receive the detected road features and to automatically control at least one vehicle feature based, in part, on the detected road features.

17. The vehicle of claim 16, wherein the artificial neural network includes a plurality of computational pipelines configured to receive respective sub-bands of the decomposed image data and to output respective feature maps, each computational pipeline including convolutional layers and pool layers, wherein the artificial neural network is configured to concatenate the output respective feature maps to provide concatenated feature maps, wherein plural feature maps from the computational pipelines are linked together in series, and wherein the artificial neural network includes fully connected layers configured to detect road features based on the concatenated feature maps.

18. The vehicle of claim 16, wherein the artificial neural network is configured to process only one of the decomposed image data.

* * * * *